(12) United States Patent
    Littlewood

(10) Patent No.: US 7,788,169 B1
(45) Date of Patent: Aug. 31, 2010

(54) METHOD AND SYSTEM FOR PROVIDING AGGREGATION OF TRADING ON MULTIPLE ALTERNATIVE TRADING SYSTEMS

(75) Inventor: Margaret G. Littlewood, Andover, MA (US)

(73) Assignee: ITG, Inc., New York, NY (US)

( * ) Notice: Subject to any disclaimer, the term of this patent is extended or adjusted under 35 U.S.C. 154(b) by 0 days.

(21) Appl. No.: 12/632,555

(22) Filed: Dec. 7, 2009

Related U.S. Application Data

(63) Continuation of application No. 12/489,174, filed on Jun. 22, 2009, now Pat. No. 7,739,188, which is a continuation of application No. 12/256,941, filed on Oct. 23, 2008, now Pat. No. 7,617,150, which is a continuation of application No. 11/036,113, filed on Jan. 14, 2005, now Pat. No. 7,487,125.

(51) Int. Cl.
    *G06Q 40/00* (2006.01)
(52) U.S. Cl. ....................................... 705/37
(58) Field of Classification Search ............. 705/37
    See application file for complete search history.

(56) References Cited

U.S. PATENT DOCUMENTS

| | | |
|---|---|---|
| 6,278,982 B1 | 8/2001 | Korhammer et al. |
| 6,892,186 B1 | 5/2005 | Preist |
| 7,113,924 B2 | 9/2006 | Fishbain |
| 7,246,093 B1 | 7/2007 | Katz |
| 2002/0010672 A1 | 1/2002 | Waelbroeck et al. |
| 2002/0107748 A1 | 8/2002 | Boies et al. |
| 2002/0116315 A1 | 8/2002 | Grey et al. |
| 2003/0177082 A1 | 9/2003 | Buckwalter |
| 2004/0034591 A1 | 2/2004 | Waelbroeck et al. |
| 2004/0059666 A1 | 3/2004 | Waelbroeck et al. |
| 2004/0143538 A1 | 7/2004 | Korhammer et al. |
| 2004/0215538 A1 | 10/2004 | Smith et al. |
| 2005/0125326 A1 | 6/2005 | Nangalia et al. |

(Continued)

OTHER PUBLICATIONS

Global Investment Technology, The Electronic Marketplace, "Lure of Algorithmic Trading Invigorates Order-Working Strategies on the Buy Side", Jun. 7, 2004, 2 pages.

*Primary Examiner*—Charles R Kyle
*Assistant Examiner*—David L Wood
(74) *Attorney, Agent, or Firm*—Rothwell, Figg, Ernst & Manbeck, P.C.

(57) ABSTRACT

A method for performing financial trading amongst a plurality of alternative trading systems using a common financial computer platform. The method including the steps of receiving at the common financial computer platform a buy-order for a prescribed number shares at a prescribed price. Electronic communication is then established between the common financial computer platform and each of the plurality of alternative trading systems. At least a portion of the buy-order is then submitted from the common financial computer platform to each of the plurality of alternative trading systems. The common financial common platform then monitors each of the plurality of alternative trading systems to determine if at least a portion of the buy-order was executed by one of the plurality of alternative trading systems. And if yes, then that indicated execution for one of the plurality of alternative trading systems is automatically accepted and automatically canceled are the remaining buy orders that were submitted to the other alternative trading system which were not yet executed.

48 Claims, 3 Drawing Sheets

U.S. PATENT DOCUMENTS

| | | |
|---|---|---|
| 2005/0222936 A1 | 10/2005 | Panariti et al. |
| 2005/0246263 A1 | 11/2005 | Ogg et al. |
| 2005/0273419 A1 | 12/2005 | Ogg et al. |
| 2006/0047590 A1 | 3/2006 | Anderson et al. |
| 2006/0085319 A1 | 4/2006 | Nangalia et al. |
| 2006/0129473 A1 | 6/2006 | Hansen et al. |
| 2006/0136318 A1 | 6/2006 | Rafieyan et al. |
| 2009/0281954 A1 | 11/2009 | Waelbroeck et al. |
| 2010/0076906 A1 * | 3/2010 | Eubank et al. ............ 705/36 R |

* cited by examiner

METHOD AND SYSTEM FOR PROVIDING AGGREGATION OF TRADING ON MULTIPLE ALTERNATIVE TRADING SYSTEMS

REFERENCE TO RELATED APPLICATIONS

This patent application is a continuation of and claims priority to co-pending U.S. patent application Ser. No. 12/489,174, filed on Jun. 22, 2009, which is a continuation of U.S. patent application Ser. No. 12/256,941, filed on Oct. 23, 2008, now U.S. Pat. No. 7,617,150, which is a continuation of U.S. patent application Ser. No. 11/036,113, filed on Jan. 14, 2005, now U.S. Pat. No. 7,487,125, the contents of each of which are hereby incorporated by reference.

FIELD OF THE INVENTION

The present invention generally relates to computer systems for trading and analyzing selected securities, and more particularly, a method and system for aggregating and integrating securities trading information and order placement to and execution from various Alternative Trading Systems (ATS) on a common platform.

BACKGROUND OF THE INVENTION

There are currently three primary types of computer accessible trading systems for securities such as stocks, bonds, commodities and derivatives. The first is the conventional stock exchange system exemplified by the New York Stock Exchange and New York Mercantile Exchange. On such exchanges, the market is made for each security by a single registered stock dealer, such as a registered stock specialist, who has a seat on the exchange. In addition to face-to-face and telephone communication to the dealers/specialists on the floor, computers are used to send orders to the dealers/specialists on the exchange floor. Information as to the buy and sell prices (bid/offer prices, respectively) are supplied by the dealer/specialist to the exchange and brokers through the dealer/specialist's trading computer terminal. Electronic orders are matched by the dealer/specialist maintaining an orderly market. Upon matching an order, the dealer/specialist confirms the execution with the trading terminal and an automated central order book that stores transaction data.

The second system is made up of electronic exchanges which utilize electronic access to dealer posted market prices without a negotiating specialist or floor based exchange. The largest of these is NASDAQ. It is a totally computer-based market where each member dealer can make its own market in the stocks traded on the exchange through a computer network. Dealers trading a significant number of shares in a stock in their own name and profiting from the spread (i.e., the difference between the price which they purchase shares and the price for which they sell them) are called market makers. Market makers are most often, but not always, large financial institutions. There are usually a number of market makers in a stock, each bidding and offering stock for themselves or their customer.

Electronic exchanges may place, match, record and confirm transactions through their computer network. If a market order is placed through, for example NASDAQ without any restrictions, the NASDAQ computers make the actual match between an offer price and the bid price and thus will select the parties for the transaction. However a broker may indicate a preference to buy from or sell to a particular market maker.

Historically, market makers have solely determined the prices for securities on electronic exchanges such as NASDAQ. Non-members must place their orders and their customers' orders with a member dealer or ECN who receives a placement fee. Similar to other securities exchanges, electronic exchanges, such as NASDAQ, receive a fee for each such transaction.

The third trading system is Alternative Trading Systems ("ATS"), which provide ATS users and electronic exchange users and buy side traders, an electronic network by which they may directly interact with order flow and execute their orders independent of a market maker or specialist. By doing so, members avoid conventional fees while accessing liquidity anonymously. ATS's provide the user the opportunity to buy/sell stock without using an intermediary such as a broker, specialist, or market maker. Therefore, a buy side trader avoids the perils of displaying his/her order to the street—i.e. the specialist buying/selling stock ahead of his/her order for a penny above his/her limit, the broker shopping the order around, and inevitably the price running in an unfavorable direction because they have shown their hand. Since there is no "middle man", the buy side trader trades directly with another trader who has an order on the opposite side. In addition to maintaining anonymity, the average trade size in the 6 major ATS's ranges from 5600 shares to 70,000 shares while the average trade size across all of the traditional exchanges has decreased significantly since the introduction of decimalization in 2001. In fact, as of Jul. 31, 2004, the average trade size on the NYSE is 410 shares (according to NYSE.com). Trade cost analysis has shown that it is advantageous for buy side traders to buy/sell large blocks of stock at one price thus avoiding market timing risk and opportunity cost.

The popularity of ATS's has increased as the need for anonymous access to liquidity has exploded and the need to achieve best execution at the lowest cost has increased sharply. ATS's provide electronic execution at a reduced commission rate. The industry standard commission rate to a traditional broker-dealer is between 0.04 to 0.05 cents per share while ATS's are paid 0.02 cents per share. While ECN's are a subset of ATS' S, this invention focuses exclusively on ATS's which are considered crossing networks. ECN's display limit orders if no internal match is found in the system. ATS's maintain their limit orders in a black box, thus maintaining the anonymity of their clients and their respective orders. Therefore, the limit book is never displayed to market participants. The first indication that an ATS had orders on its book occurs after a match is found. At this point, the match or trade would hit the third market tape and execution reports are simultaneously sent back to the participants.

There are currently numerous crossing networks, including, but not limited to: ITG POSIT; Liquidnet; Harborside; Instinet Cross; Pipeline, and NYFIX Millennium. Given the recent surge in electronic trading, demand for access to the individual ATS's and the resulting traffic has increased sharply.

Typically, each user of an ATS has an application on his/her desktop providing electronic access to the ATS's crossing network. Members send their bids and offers electronically and conduct transactions through the resulting network. Each ATS operates its crossing network differently while its computer network takes into consideration all order information supplied to it in real time by its members. While never displaying the orders or the members' identity, the crossing network records which computer and thus, which member posted each bid or offer. A match is found when the individual orders of a buyer and a seller in the crossing network have the same criteria (namely order size and price limit) and thus, match up for execution. The execution is printed on the tape and the participants are informed that their respective orders have been filled. All the while maintaining their anonymity as the buyer has no idea who the seller is and vice versa. The previously accepted bid and offers are no longer available for the upcoming match or cross until the buyer and seller reload.

The demand for these crossing networks provided by ATS's has grown significantly in recent years. When decimalization was introduced in 2001, the markets became extremely fragmented and the average trade size decreased substantially. While these changes have benefited retail investors, it has become increasingly difficult for buy side traders to find liquidity, or large blocks of stock in the inside quote. At the same time, buy side traders are measured by much higher standards than ever before. Pre trade analytics and trade cost analysis are the industry standard by which every trade is measured. The buy side trader must add value to the investment process and prove quantitatively that he/she is providing investors of their company's fund with best execution on each and every trade. With competition greater than ever before and a real need to find liquidity anonymously, the volume traded on ATS's has exploded, now totaling an average of 100 million shares a day across the six major ATS's.

The development of a multitude of ATS's and Algorithmic trading solutions has created a tremendous challenge for buy side traders. These systems have also contributed to major fragmentation of order-flow. This environment has made it increasingly difficult to capture the other side of a trade. Large institutional buyers/sellers of an illiquid stock find it harder to find that other side without adversely affecting the price. This is largely due to order flow being spread out among several alternative trading systems and the participants varying on each system. Furthermore, there are six major crossing networks or ATS's currently. If the asset management company for which buy side trader works only allows access to 2 or 3 ATS's on their desktop, he/she is missing out on significant volume (on the other ATS's) yet is judged against the composite volume for any stock in which he/she has an order. This is especially detrimental when trading small cap and/or illiquid stocks since one block of stock could potentially make up most of the daily volume.

While it is possible to subscribe to all 6 ATS's independently on a trader's desktop, it poses several problems: it gives the illusion that there are 6 individual orders in the marketplace causing adverse price fluctuations. Using 6 systems simultaneously is cumbersome, time intensive, requires extensive training, poses substantial risk to their firm in possible errors, and takes up substantial bandwidth thus slowing down the trading desk's order management system and other trading applications.

Therefore, an object of the present invention is to overcome the above-noted deficiencies associated with existing protocols for using ATS's and to provide a unique strategy to minimize market impact while accessing liquidity found in ATS's. One stop shopping reduces costs in an increasingly competitive environment, sidesteps traditional marketplaces (i.e. NYSE and NASDAQ where market makers and specialists often take advantage of order flow information), time efficient, and avoids issue of having the buy side trader's OMS blotter swept. (Liquidnet sweeps the entire order blotter of their users. This is a significant deterrent to some buy side trading desks who don't currently subscribe to their network).

Unlike LAVA, an aggregating system which simply provides ACCESS to ECN's, exchanges and only a few ATS's, the present invention will intuitively streamline the data most relevant to achieving best execution of the trade. By providing access to all major ATS's, and through the use of its unique strategy and smart router, buy side traders exclusively will have the ability to interact with liquidity anonymously in real time.

SUMMARY OF THE INVENTION

A method for performing financial trading amongst a plurality of Alternative Trading Systems using a common financial computer platform. The method including the steps of receiving at the common financial computer platform a buy-order for a prescribed number shares at a prescribed price wherein the buy order includes the number of stock shares to be purchased, price limits for the number of stock shares to be purchased and the percentage of the buy-order that may be consummated during a business day. Electronic communication is then established between the common financial computer platform and each of the plurality of alternative trading systems wherein the common financial computer platform being configured to individually communicate with each of the plurality of alternative trading systems without any further modification to the common financial computer platform.

At least a portion of the buy-order is then submitted from the common financial computer platform to each of the plurality of alternative trading systems. Preferably, the number of shares prescribed in the buy-order is divided by a number equal to the number of alternative trading systems contained in said plurality of alternative trading systems and that divided shares amount is submitted to each of the plurality of alternative trading systems.

The common financial common platform then monitors each of the plurality of alternative trading systems to determine if at least a portion of the buy-order was executed by one of the plurality of alternative trading systems. And if yes, then that indicated execution for one of the plurality of alternative trading systems is automatically accepted and automatically canceled are the remaining buy orders that were submitted to the other alternative trading system which were not yet executed.

The common financial computer platform then preferably determines an alternative trading system from one of the plurality of alternative trading systems that is to receive a balance of the outstanding buy-order after the executing alternative trading systems executed the submitted at least a portion of said buy-order.

BRIEF DESCRIPTION OF THE DRAWINGS

The above and other objects and advantages of the present invention will become more readily apparent upon consideration of the following detailed description, taken in conjunction with accompanying drawings, in which like reference characters refer to like parts throughout the drawings and in which.

DETAILED DESCRIPTION OF THE PREFERRED EMBODIMENT

Figure 1:
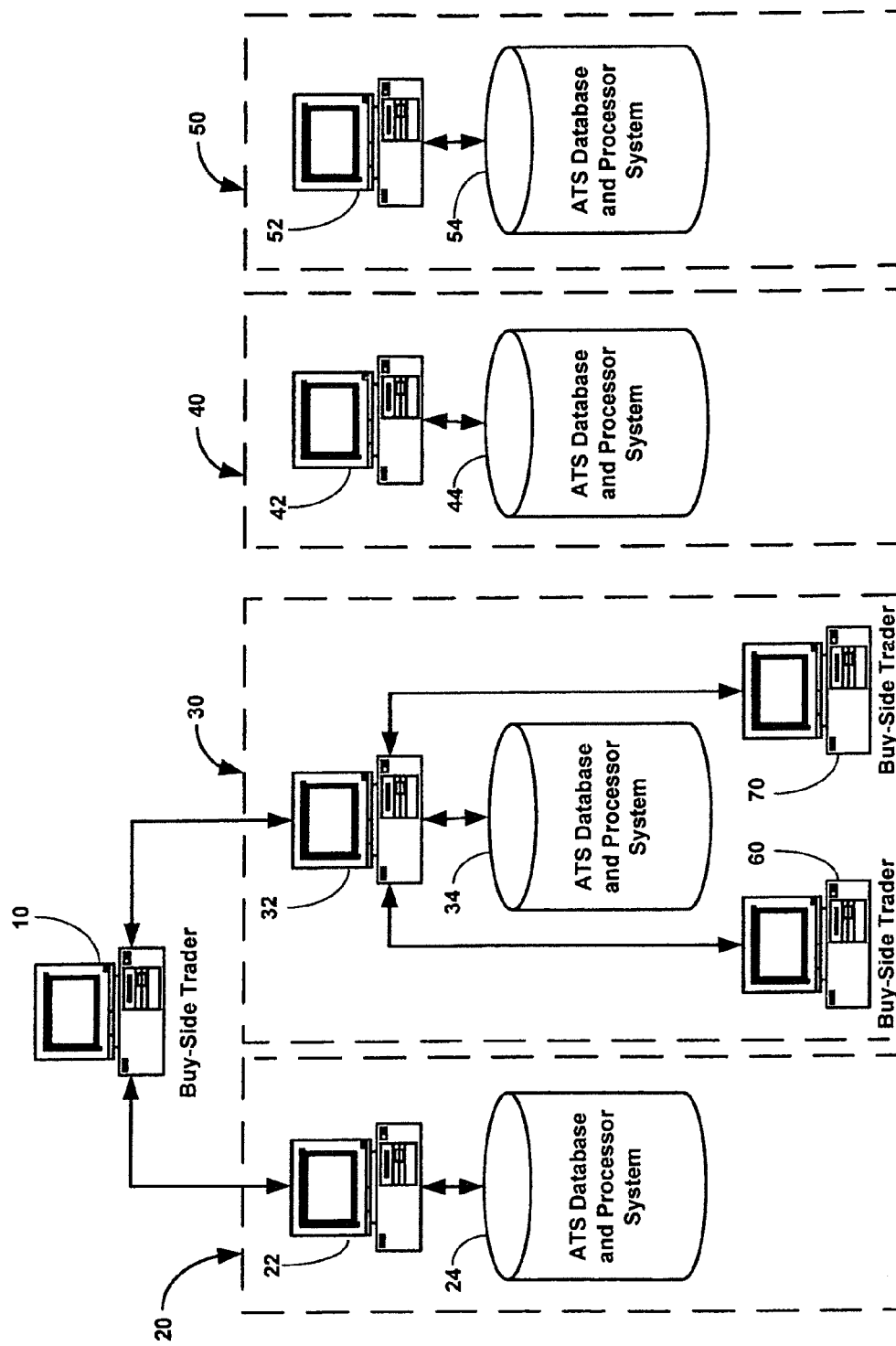
FIG. 1 is a diagrammatic chart of the prior art.

For purposes of the present invention, a "buy-side trader" is to be understood as a trader who executes orders (buy, sell, sell short) for the mutual funds and/or hedge funds of an asset management company. Now with reference to prior art methods concerning buy-side traders interaction with several ATS's, FIG. 1 generally depicts how this was accomplished. In the example of FIG. 1, buy-side trader 10 is permitted to trade with two ATS's, (e.g., ATS 20 and 30). Accordingly, for buy-side trader 10 to use both of these ATS's (e.g., ATS's 20 and 30), buy-side trader 10 had to independently contact each terminal system (e.g., computer terminals 22, 32) associated with each respective ATS (e.g., ATS 20 and 30). Thus, buy-side trader 10 had to be enabled to use at least two differing protocols to conduct business with each respective ATS (e.g., ATS 20 and 30). The buy-side trader 10 communicates with ATS 20 through computer trading terminal 22, and with ATS 30 through computer trading terminal 32. As is conventional, for enabling trades, trading terminal 22 of ATS 20 is connected to its ATS database and processor system 24 and trading terminal 32 of ATS 30 is connected to its database and processor system 34.

It is of course to be appreciated that each aforesaid ATS 20, 30 may also simultaneously be coupled to other third party buy-side traders. For instance, with respect to ATS 30, its trading terminal is shown coupled to third party buy-side traders 60 and 70.

It is shown in FIG. 1 that buy-side trader 10 is not a subscriber of ATS 40 consisting of trading terminal 42 and database and processor system 44. And like ATS 40, buy-side trader 10 is also not a member of ATS 50 consisting of trading terminal 52 and database and processor system 54. Thus buy-side trader 10 does not have access to either of ATS's 40 and 50 as there can be no interaction between their respective trading terminals 42 and 52, and database and processor system's 44 and 54.

Therefore as can be seen from FIG. 1, in the prior art system, buy side trader 10 must use separate trading terminals (22, 32) associated with each respective ATS (20, 30). Thus the buy-side trader 10 must be able to use multiple applications on one or more terminals to compare and share prices and to make his/her bids/offers. Further, the buy-side trader 10 may split a large order into bids or offers between two or more terminals or applications. The trading terminals 22 and 32 typically use different protocols to access market data, place bids and offers and execute transactions. In some real sense, this destroys the ability to trade in real-time due to the natural delays associated with collecting information from a number of trading terminals, using a number of different protocols and responding on one or more on such trading terminals. Such separate systems and terminals not only make it difficult to obtain optimal data it makes it difficult to perform analytics against the data to aid in trading decisions.

Figure 2:
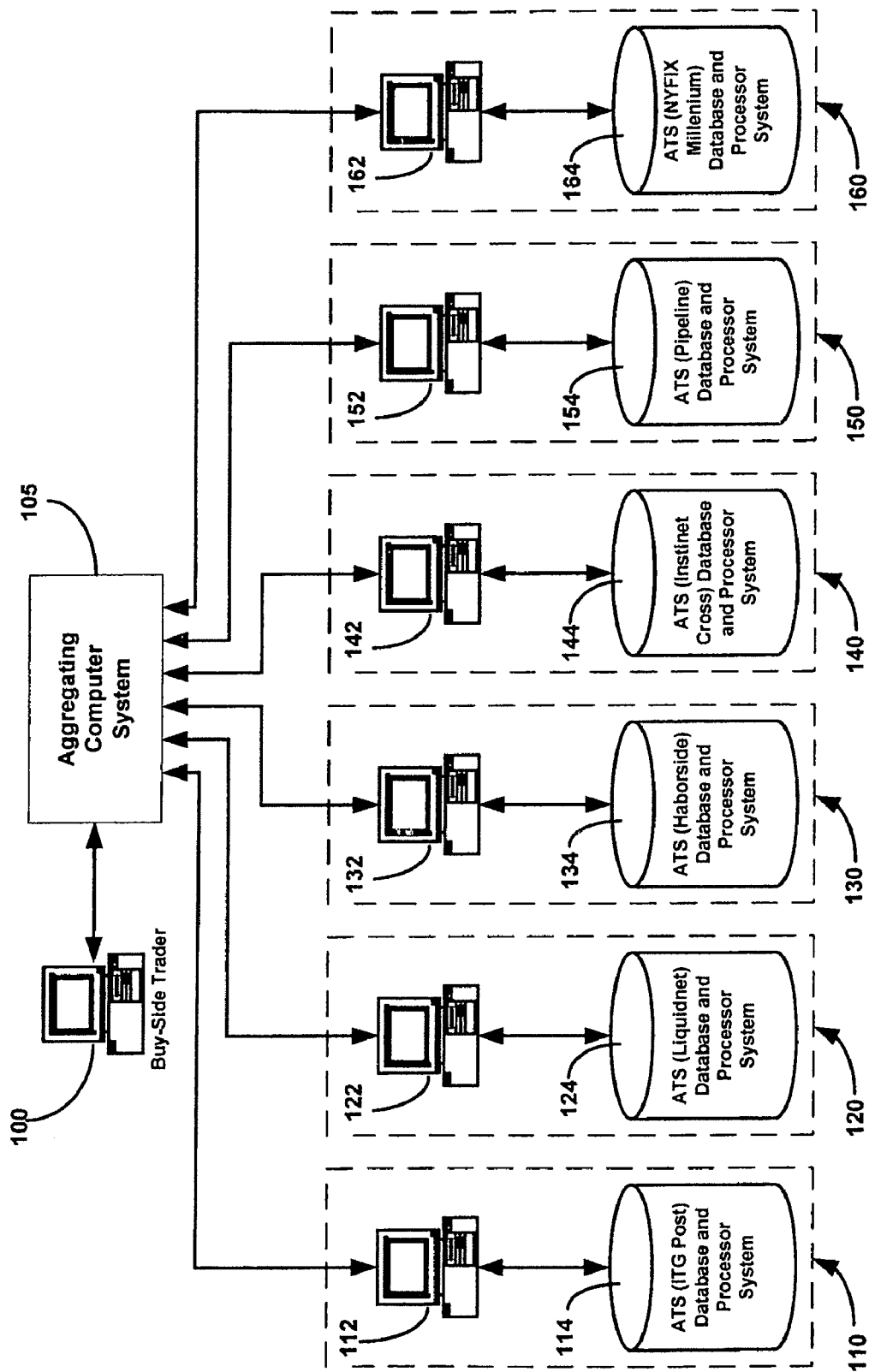
FIG. 2 is a diagrammatic chart of the present invention.

As seen in FIG. 2, the present invention eliminates the need for a buy-side trader 100 to be individually coupled to each trading terminal (112, 122, 132, 142, 152, 162) for each respective ATS (110, 120, 130, 140, 150, 160). This is achieved through the use of an Aggregating Computer System (ACS) 105. Preferably, ACS 105 comprises a computer processor coupled to one or more databases and having the necessary algorithms and software programs for enabling the below described functionality.

What is shown in FIG. 2 is the ACS 105 electronically coupled to a plurality ATS's 110-160 via their respective trading terminals 112-162. It is to be appreciated that the ACS 105 is only applicable for use with buy-side traders and is not intended for any sell-side traders in furtherance of maintaining the anonymity of the buy-side trader.

In the preferred embodiment of the present invention, ACS 105 is preferably coupled to the trading terminals of ATS's for: ITG POSIT 110; Liquidnet 120; Harborside 130; Instinet Cross 140; Pipeline 150; and NYFIX Millennium 160. It is of course to be appreciated that in accordance with the present invention, ACS 105 is coupled and interoperable with as many different ATS's as desired, thus the present invention is not to be understood to be limited only to the ATS's shown in FIG. 2.

The ACS 105 performs a number of interrelated functions that may be carried out on one computer or a network of computers. ACS 105 is configured to provide the buy-side trader 100 complete access and functionality to each aforesaid coupled ATS (110, 120, 130, 140, 150, 160) on a single computer platform. As will be explained below, the buy-side trader 100, through implementation of ACS 105, will become immediately aware if any volume in trades of stock become available from any of the ATS's (110, 120, 130, 140, 150, 160) to which buy-side trader 100 previously submitted an order to. Further, the ACS 105 is configured to be fully interoperable with each aforesaid ATS 110-160 such that ACS 105 is programmed with the individual communication protocols associated with each platform associated with each ATS 110-160 necessary to enable bilateral trading communication between the ACS 105 and each ATS 110-160.

It is to be appreciated that while the underlying principle and goal of crossing networks is the same, each ATS operates slightly differently and maintains different membership criteria. The platform will give full access to the information maintained on each crossing network as well as complete functionality of each ATS. Protocols included will be basic communication to enter buy/sell orders that interact with each ATS, the ability to include/exclude any of the ATS's, the ability to negotiate with participants on each system, the ability to change parameters during the life of the order-order size, price limits, percentage to be executed over the course of the day given the opportunity, ability to expand upon the order if original order is completed, ability to receive and negotiate a program (a program is a computer file of numerous orders that need to be executed over a specific time period, given specific parameters such as price or other strategies. An example of a program trade would be a file consisting of 250 buys/250 sells that need to be executed if able to do so in the inside quote. The system needs to be able to handle that type of order flow as well since it is a large percentage of trading volume on a daily basis. Furthermore, there are no existing platforms to send small cap programs to and this platform is ideal for such a program given the illiquid nature of small cap stocks.)

Therefore, as depicted in FIG. 2, rather than a buy-side trader 100 being individually coupled to each individual ATS, as is required by the prior art system of FIG. 1, the ACS 105 of the present invention is configured to enable instantaneous communication with each aforesaid ATS so to submit and collect order information from each individual ATS. It is to be appreciated that ACS 105 communicates anonymously with each ATS 110-160 whereby the identity of the buy-side trader 100 is concealed to each ATS 110-160 and the buy-side trader accesses all pools of liquidity on each ATS quickly and efficiently without adversely affecting the stock price. In other words, the buy-side traders 100 are never displayed to any other third party since the ACS 105 functions as an anonymous intermediary between the buy-side trader 100 and each aforesaid ATS. It is to be appreciated that ACS 105 may be configured in numerous configurations, including, but not limited to as a software system on a PC associated with a buy-side trader, as a broker-dealer type of platform, or as a hybrid solution that allows the buy-side trader to interoperate with both aforesaid buy-side traders PC and broker-dealer type of platform. Through preferably the software implemented in ACS 105, a buy-side trader preferably controls the various known parameters of their order through the use of price limits, inclusion/exclusion of any of the ATS's 110-160, percentage of the overall order to send each ATS, and access to a smart router.

In regards to the present invention, a smart router is to be understood as preferably be enabled to transmit orders to the most advantageous ATS based on historical trading data. For example, if the buy-side trader wanted to send an order in XYZ to the platform, the smart router would determine from historical data, which of the ATS's traded the most overall volume in XYZ in the past month. The smart router could be set up using different parameters depending on the buy-side trader's strategy. Some trading styles are more price sensitive (in which case price data could be obtained—which ATS provided liquidity with minimum price impact in the past month? Some traders care more about volume—which ATS traded the most volume in the past month in stock, XYZ? Some traders are more concerned with market cap—which ATS traded the largest percentage of small cap stocks in the past month?) In summation, the smart router equips the buy-side trader with the ability to send his/her order in real time to the optimum destination based on historical performance.

As will also be explained below, once there has been a "hit" by one of the ATS's 110-160 regarding an order submitted by ACS 105, the ACS 105 is configured to automatically terminate the orders submitted to the remaining ATS's 110-160. Thus, this is advantageous because the buy-side trader 100 is enabled to reevaluate the outstanding order strategy so as to not mislead the market that there are actually several other orders on the same side of one security via the remaining ATS's 110-160. Preferably, all reports that are transmitted back to the buy-side trader 100 from the various ATS's 110-160 are transmitted to the buy-side trader via FIX. It is noted FIX stands for financial information exchange technology and it is a network which connects the buy-side to the sell-side and connects both the buy-side and the sell-side to ATS's and connects the sell-side to the trading floors—such as NYSE, AMEX. This electronic network enables order flow to be sent and executed in real time and eliminates a great deal of human error since all parameters of the order are transmitted electronically instead of being verbalized. While FIX does not eliminate the need for human interaction, it sends the basic order information and then the traders can discuss the real detail of the order and the corresponding execution reports.

Figure 3:
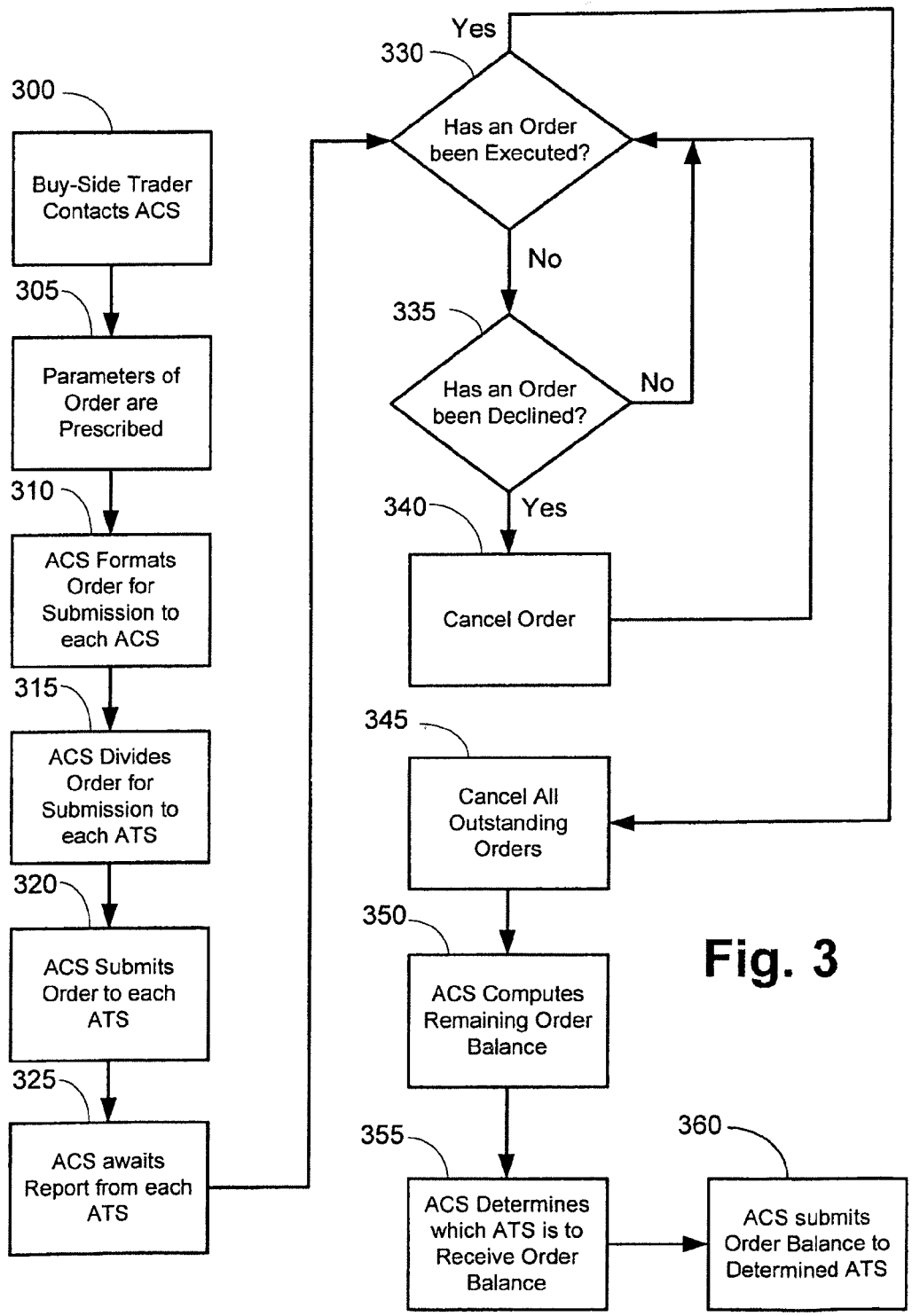
FIG. 3 is a flow diagram of the present invention of FIG. 2 depicting its operation.

With the ACS 105 and its interoperability with the ATS's 110-160 being described above, its method of operation will now be described with reference to FIG. 3 and with continuing reference to FIG. 2.

Starting at step 300, a buy-side trader 100 contacts ACS 105 to place a buy order for a prescribe commodity (e.g., stock in XYZ corp.). The buy-side trader 100 prescribes at least the necessary parameters for such an order, step 305. For instance, such parameters of an order may include: order size or number of shares, price limits, percentage of the order to be worked over the course of the day or percentage of the order to be sent to each ATS if it should not be divided equally among the 6 ATS's, the ability to reload if the first part of the order is executed, strategies in line (to pay inside the quote) or scale (to bring the stock in if you're a buyer or scale it up if you're a seller) momentum—to continue to pay up as a buyer or to continue to sell at lower prices.

For purposes of more fully understanding the method depicted in FIG. 2, a trading scenario will be described whereby a buy-side trader 100 desires to buy 60,000 shares of XYZ corp. at a price no higher than $43.00 per share.

After the ACS 105 receives the buy-side trader's 100 order, it then formats the order for submission to each ATS 110-160 it is preferably coupled to, step 310. As mentioned above, each individual submission of an order to each ATS 110-160 shall meet the protocol requirement prescribed by each aforesaid individual ATS 110-160. Additionally, ACS 105 preferably divides the buy-side trader's 100 order request (e.g., 60,000) equally for each ATS 110-160 an order is to be submitted thereto, step 315. For example, if the ACS 105 is to submit an order to each ATS 110-160, then each submission to each ATS 110-160 shall be for 10,000 shares of XYZ corp. Thus in step 320, an order for 10,000 shares of XYZ corp. at a price no higher than $43.00 per share is electronically submitted from ACS 105 to each of ATS's 110, 120, 130, 140, 150 and 160. After submission, ACS 105 awaits reports from each ATS 110-160 indicating whether an individual order (e.g., 10,000 shares of XYZ corp.) on a respective ATS was executed or not, step 325.

At step 330 a determination is made as to whether any of the ATS's 110-160 to which an order was submitted actually executed an aforesaid order submission (e.g., 10,000 shares of XYZ corp.). If no, then a determination is made as to whether a report has been issued from one of the ATS's 110-160 to which an order was submitted indicating a decline for execution of the order, step 335. If yes (an order submission was declined by ATS 130), then the ACS 105 cancels the order submission to that declining ATS (e.g., ATS 130) with the remaining individual orders (e.g., 10,000 shares of XYZ corp.) for each of the remaining ATS's (e.g., ATS's 110, 120, 140, 150 and 160) being in an active state, step 340. And if at step 335, a determination is made that no reports were issued from any ATS's declining execution of an order, then the process returns to step 330 for a determination as to whether any of the remaining ATS's executed an aforesaid order submission (e.g., 10,000 shares of XYZ corp.).

If at step 330 reports were issued from one or more ATS's indicating that THE BID was at least partially executed (e.g., ATS 110 executed the order for the entire 10,000 shares of XYZ corp. and ATS 160 executed the order for 5,000 shares) then the outstanding order submissions to the remaining ATS's (e.g., ATS's 120, 140 and 150) are immediately canceled, step 345. Preferably ACS 105 then determines the remaining balance of the shares for the buy-side trader's original order (step 305) that is still outstanding (e.g., 45,000 shares of XYZ corp.), step 350. Next, ACS 105 determines which ATS should the outstanding balance of the order (e.g., 45,000 shares of XYZ corp.) be submitted to for execution thereof, step 355. If at step 330 only one ATS (e.g., ATS 110) executed an order, then ACS 105 would preferably determine to send the outstanding balance of the order (e.g., 45,000 shares of XYZ corp.) to that ATS (e.g., ATS 110). If however more than one ATS executed an order submission from ACS 105 (e.g., ATS 110 executed the order for the entire 10,000 shares of XYZ corp. and ATS 160 executed the order for 5,000 shares), then ACS 105 preferably determines from which ATS that previously executed an order (ATS 110 and 160) should receive the submission for the outstanding order balance (e.g., 45,000 shares of XYZ corp.). It is to be appreciated that ACS 105 may use various parameters to make this determination including bid price, share availability, number of participants on the other side of the trade, trading style of the buy side trader who is the user of the system—passive—more price sensitive/aggressive—more concerned with accumulating volume, the user's entire picture (if filled on 15,000 shares and the remaining order is for 45,000 shares, the determination on whether or not to send the entire 45,000 shares is largely based on what the buy-side trader's entire order is for.) Even though the user sent 60,000 shares to the platform, he/she may have an additional 1 million shares behind it.

For purposes of this description, ACS 105 determines that ATS 110 will receive the outstanding balance of the order (e.g., 45,000 shares of XYZ corp.) since ATS 110 originally executed the order for more shares (e.g., 10,000) than that of ATS 160 (e.g., 5,000 shares). Thus, at step 360 ACS 105 submits A BID for the balance (e.g., 45,000 shares of XYZ corp.) of the original buy-side traders ORDER (e.g., 60,000 shares) to the ATS as determined in step 355 (e.g., ATS 110). It is to appreciated that in the event the ATS determined in step 355 (e.g., ATS 110) is unable to execute on the entire balance remaining (e.g., 45,000 shares) then the ACS 105 may be configured to recalculate the balance remaining after execution by the ATS determined in step 355 (e.g., ATS 110) and submit that balance for execution to another ATS involved in the determination of step 355 (e.g., ATS 160).

Therefore a clear advantage of the present invention is that ACS 105 is enabled to simultaneously place bids/offers to a plurality of ATS's, with each bids/offers only being a portion of the buy-side traders entire order (step 305) so as to acquire the desired commodity at a most efficient price since no one ATS is initially aware of the entire buy-side trader's order. Otherwise, if an ATS was originally aware of the entire buy-side trader's order, that ATS could cause unfavorable changes in the price of the aforesaid desired commodity. A further advantage of the present invention is that when one or more ATS's report execution of an order, the ACS 105 automatically cancels the outstanding orders with all other ATS's. This is advantageous because it does not leave any footprints. In other words, it does not leave the impression that there are 6 individual orders on one side for that one security.

In an alternative embodiment of the present invention, at step 355, instead of the ACS 105 determining which ATS shall receive the submission for the balance of the buy-side trader's order, a user of ACS 105 contacts the buy side-trader 100 to strategize as to which ATS shall receive the balance of the order. This is advantageous because at this point, the buy-side trader is given information regarding the order flow across 6 ATS's at the same time. This enables the buy-side trader to rethink strategy and change parameters of the order if necessary. This gives the buy-side trader options—to change order, to stick with original parameters to reload or add to the order, to strategize based upon information received and to have a trained professional deliver and interpret the information—to aid in the negotiation process with the ATS's.

In summary, a system and method for aggregating and strategically accessing multiple ATS's across multiple platforms for maximizing the value of a buy-side trader's order has been described. Although the present invention has been described with emphasis on particular embodiments, it should be understood that the figures are for illustration of the exemplary embodiment of the invention and should not be taken as limitations or thought to be the only means of carrying out the invention. Further, it is contemplated that many changes and modifications may be made to the invention without departing from the scope and spirit of the invention as disclosed.

What is claimed is:

1. A computer implemented method for performing financial trading amongst a plurality of electronic trading systems comprising the steps of:

receiving an order to trade a prescribed amount of shares of a tradable asset;

electronically submitting portions of the order to a plurality of electronic trading systems such that the submitted order portions are distributed amongst the plurality of electronic trading systems;

determining if at least one of the submitted order portions was at least partially matched by one of the plurality of electronic trading systems; and automatically canceling a submitted order portion that was not at least partially matched by one of the plurality of electronic trading systems by about the time at least one of the submitted order portions was at least partially matched by one of the plurality of electronic trading systems.

2. The method of claim 1, wherein the order is a buy order.

3. The method of claim 1, wherein the order is a sell order.

4. The method of claim 1, wherein the electronic trading systems include an alternative trading system.

5. The method of claim 4, wherein the alternative trading system accepts non-binding orders.

6. The method of claim 1, further comprising the step of separating the order into a plurality of order portions for submission to the plurality of electronic trading systems.

7. The method of claim 6, wherein said separating step includes dividing a number of shares prescribed in the order by a number equal to the number of electronic trading systems contained in the plurality of electronic trading systems.

8. The method of claim 6, wherein said separating step includes dividing the order into a plurality of order portions which are not all equal in size.

9. The method of claim 8, wherein said receiving step includes receiving a percentage of the order to be sent to each electronic trading system.

10. The method of claim 1, wherein said receiving step includes receiving a percentage of the order to be worked over the course of the day.

11. The method of claim 1, further comprising the steps of providing a smart router; and transmitting an order portion from the smart router to at least one electronic trading system based on historical data.

12. The method of claim 1, further comprising the step of computing a remaining balance of shares of the order that has not been matched.

13. The method of claim 12, further comprising the step of selecting one or more of the electronic trading systems for submission of the remaining balance of shares.

14. The method of claim 13, further comprising the step of submitting one or more order portions for the remaining balance of shares to the selected one or more electronic trading systems.

15. The method of claim 1, wherein said canceling step occurs upon determining that at least one of the order portions has been at least partially matched by one of the electronic trading systems.

16. The method of claim 1, wherein said submitting step includes configuring at least one order portion to be at least partially executed when matched by one of the electronic trading systems.

17. The method of claim 1, wherein said submitting step includes configuring at least one order portion to be cancelled when it is not at least partially matched by one of the electronic trading systems.

18. The method of claim 1, wherein said canceling step includes canceling all submitted order portions that were not at least partially matched by one of the plurality of electronic trading systems by about the time at least one of the submitted order portions was at least partially matched by one of the plurality of electronic trading systems.

19. A system for performing financial trading amongst a plurality of electronic trading systems comprising:

a common computer platform configured to communicate with each of the electronic trading systems and further configured to:
receive an order for a prescribed amount of shares of a tradable asset;
electronically submit portions of the order to a plurality of electronic trading systems such that the submitted order portions are distributed amongst the plurality of electronic trading systems;
determine if at least one of the submitted order portions was at least partially matched by one of the plurality of electronic trading systems; and
automatically cancel a submitted order portion that was not at least partially matched by one of the plurality of electronic trading systems by about the time at least one of the submitted order portions was at least partially matched by one of the plurality of electronic trading systems.

20. The system of claim 19, wherein said common computer platform includes a smart router configured to transmit an order portion to at least one predetermined electronic trading system based upon historical data.

21. The system of claim 19, wherein the electronic trading systems include an alternative trading system.

22. The system of claim 21, wherein the alternative trading system accepts non-binding offers.

23. The system of claim 19, wherein said common computer platform is further configured to divide a number of shares prescribed in the order by a number equal to the number of electronic trading systems contained in the plurality of electronic trading systems.

24. The system of claim 19, wherein said common computer platform is further configured to divide a number of shares prescribed in the order into a plurality of order portions which are not all equal in size.

25. The system of claim 24, wherein said common computer platform is further configured to receive a percentage of the order to be sent to each electronic trading system.

26. The system of claim 19, wherein said common computer platform is further configured to receive a percentage of the order to be worked over the course of the day.

27. The system of claim 19, wherein said common computer platform is further configured to calculate a remaining balance of shares of the order that has not been executed.

28. The system of claim 27, wherein said common computer platform is further configured to select one or more of the electronic trading systems for submission of the remaining balance of shares.

29. The system of claim 28, wherein said common computer platform is further configured to submit one or more order portions for the remaining balance of shares to the chosen electronic trading systems.

30. The system of claim 19, wherein said common computer platform is further configured to immediately cancel an unmatched order portion upon determining that one or more of the order portions has been at least partially matched by one of the electronic trading systems.

31. The system of claim 19, wherein said common computer platform is further configured to configure at least one order portion to be at least partially executed when matched by one of the electronic trading systems.

32. The system of claim 19, wherein said common computer platform is further configured to cancel all submitted order portions that were not determined to be at least partially matched by one of the plurality of electronic trading systems.

33. A computer implemented method for performing financial trading amongst a plurality of electronic trading systems comprising the steps of:
receiving, at a computer system, an order to trade a prescribed amount of shares of a tradable asset;
electronically submitting portions of the order to a plurality of electronic trading systems such that the submitted order portions are distributed amongst the plurality of electronic trading systems; and
causing cancellation of an order portion that was not at least partially matched by one of the plurality of electronic trading systems by about the time at least one of the submitted order portions was at least partially matched by one of the plurality of electronic trading systems.

34. The method of claim 33, wherein the order is a buy order.

35. The method of claim 33, wherein the order is a sell order.

36. The method of claim 33, wherein the electronic trading systems include an alternative trading system.

37. The method of claim 36, wherein the alternative trading system accepts non-binding orders.

38. The method of claim 33, further comprising the step of separating the order into a plurality of order portions.

39. The method of claim 38, wherein said separating step includes dividing a number of shares prescribed in the order by a number equal to the number of electronic trading systems contained in the plurality of electronic trading systems.

40. The method of claim 38, wherein said separating step includes dividing the order into a plurality of order portions which are not all equal in size.

41. The method of claim 40, wherein said receiving step includes receiving a percentage of the order to be sent to each electronic trading system.

42. The method of claim 33, wherein said receiving step includes receiving a percentage of the order to be worked over the course of the day.

43. The method of claim 33, further comprising the steps of providing a smart router; and transmitting an order portion from the smart router to at least one electronic trading system based on historical data.

44. The method of claim 33, further comprising the step of computing a remaining balance of shares of the order that has not been executed.

45. The method of claim 44, further comprising the step of choosing one or more of the electronic trading systems for submission of the remaining balance of shares.

46. The method of claim 45, further comprising the step of submitting one or more order portions for the remaining balance of shares to the chosen electronic trading systems.

47. The method of claim 33, further comprising the step of determining, at the computer system, whether or not each of the submitted order portions was matched by one of the plurality of electronic trading systems.

48. The method of claim 47, wherein said step of causing cancellation includes canceling at least one order portion that was determined to not be at least partially matched by one of the plurality of electronic trading systems.

* * * * *